(12) United States Patent
Verhoeven et al.

(10) Patent No.: US 6,301,641 B1
(45) Date of Patent: Oct. 9, 2001

(54) METHOD FOR REDUCING THE FREQUENCY OF CACHE MISSES IN A COMPUTER

(75) Inventors: Marcus G. A. Verhoeven; Ramon A. W. Clout; Alexander Augusteijn, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/031,696

(22) Filed: Feb. 27, 1998

(30) Foreign Application Priority Data

Feb. 27, 1997 (EP) .................................................. 97200575

(51) Int. Cl.$^7$ .............................. G06F 12/00; G06F 7/00; G06F 9/45

(52) U.S. Cl. ......................... 711/118; 711/170; 711/165; 711/133; 711/125; 711/134; 707/2; 395/709

(58) Field of Search ..................................... 711/125, 133, 711/134, 118, 170, 165; 707/2; 395/709

(56) References Cited

U.S. PATENT DOCUMENTS

| | | | |
|---|---|---|---|
| 5,212,794 | * 5/1993 | Pettis et al. | 395/700 |
| 5,442,571 | * 8/1995 | Sites | 364/403 |
| 5,933,644 | * 8/1999 | Wallace | 395/709 |
| 5,963,972 | * 10/1999 | Calder et al. | 711/129 |

OTHER PUBLICATIONS

"Optimal Code Placement of Embedded Software for Instruction Caches", By Hiroyuki Timiyama et al. Published in the Proceedings of the European Design and Test Conference in Paris on Mar. 11–14, 1996, pp. 96–101.

Proceedings of the ACM Siglan'90 Conference on Programming Language Design and Implementation White Plains, New York, Jun. 20–22, 1990, Profile Guided Code Position, Karl Pettis, Robert C. Hansen. p. 16–27 see especially p. 17–22, chapter 3–5.

Proceedings/Annual Simulation symposium, Volume, Apr. 1995, (Phoenix), Frank Mueller, David B. Whalley, fast Instruction Cache Analysis via Static Cache Simulation , p. 105–p. 114, abstract, chapter 6.

Wen–mei W, Hwu et al. , Achieving High Instruction Cache Performance with an Optimizing Compiler, ACM, Dec. 1989.*

McFarling Scott, "Procedure Merging with Instruction Caches", Proceedings of the ACM SIGPLAN, Jun. 1991.*

IBM Technical Disclosure, "Instruction Placement Method to Improve Cache Behavior", vol. 37, No. 06A, Jun. 1994.*

McFarling Scott, "Program Optimization for Instruction Caches", ACM, Dec. 1989.*

* cited by examiner

Primary Examiner—Do Hyun Yoo
Assistant Examiner—Kimberly McLean
(74) Attorney, Agent, or Firm—Peter Verdonk

(57) ABSTRACT

A score is computed of how many cache misses occur for the execution of each of a number of blocks. The score is used as a heuristic in a local search in which an original selection is iteratively replaced each time by a selection that differs from the original selection only by the movement of a single block and that has a lower number of cache misses for the sample of execution than the original selection. Thus a selection of locations for placing instructions of a program in main memory is found that minimizes the number of cache misses that occur for a sample of a typical execution of the program.

12 Claims, 2 Drawing Sheets

METHOD FOR REDUCING THE FREQUENCY OF CACHE MISSES IN A COMPUTER

BACKGROUND OF THE INVENTION

The invention relates to a method of selecting memory locations for placing instructions as described in the preamble of claim 1.

SUMMARY OF THE INVENTION

A machine like a computer typically contains a main memory, a cache memory and a processor. During execution of a program the computer loads instructions from main memory for execution by the processor and copies these instructions into the cache memory. The cache memory contains cache lines, each of which may hold several instructions at a time. The memory contains locations, and the location at which an instruction is stored determines into which cache line that instruction will be copied. When the instruction is copied into the cache line a previous content of that cache line is no longer available from the cache memory. When the processor needs to execute an instruction, the computer will attempt to load that instruction from the cache memory. If the instruction is not available in the cache memory, a "cache miss" is said to occur and execution is delayed because the computer has to load the instruction from the main memory before the instruction can be executed.

A cache miss may occur when, after the time the instruction was last copied into a particular cache line, another instruction has been copied into that particular cache line. Whether this occurs depends on the main memory locations of the other instructions that have been executed since the time that the instruction was last copied into the cache line. If these locations are such that these instructions have to be copied into the particular cache line, a cache miss may occur. The number of cache misses can be minimized by a proper selection of these main memory locations so that copying into the particular cache line is not needed too often.

An article by Hiroyuki Tomiyama et al. titled "Optimal Code Placement of Embedded Software for Instruction Caches", and published in the Proceedings of the European Design and Test Conference in Paris, Mar. 11 to 14, 1996 pages 96 to 101 describes a method of selecting locations for placing instructions in the main memory so as to minimize the number of cache misses.

According to this method a sample of execution of the program is obtained. The sample indicates which instructions the processor successively executes when the machine receives a given typical data input. Using the sample a linear function is derived which calculates the number of cache misses for the sample of execution as a function of the locations where the instructions of the program are placed in main memory. By means of an undescribed local search method a minimum of this linear function is found, which corresponds to optimal locations for placing the instructions in main memory.

This known method has the disadvantage that it is very time consuming. Even for relatively small programs a computer needs an excessive amount of execution time to find an optimum. The known method reduces this amount of execution time by grouping the instructions into blocks of instructions that are always executed as a whole, and by calculating the number of cache misses at the level of blocks instead of individual instructions. But even with this improvement a computer still needs hours of execution time to find an optimum for relatively small programs.

Additionally, the known method makes very inefficient use of the locations in main memory, because it divides the program into blocks of instructions and introduces unused locations between the blocks to enforce that each cache line will contain instructions from only one block.

Amongst others, it is an object of the invention to provide for an improved method of selecting locations for placing instructions in the main memory of a machine containing a cache memory.

The method according to the invention is characterized by the characterizing part of claim 1. Potential selections are screened to select a potential selection which generally reduces the number of cache misses for the sample of execution of the program when the instructions are placed according to the potential selection instead of according to the original selection. This process is repeated, each time with the successor selection replacing the original selection.

In this method a computation of the number of cache misses is performed for potential successor selections. When a computer executes the method the computation of the number of cache misses is time-consuming, especially when it is performed for many potential selections. A score is used as a heuristic for deciding whether to compute the number of cache misses of potential selections from selections that differ from the original selection only by the movement of selected blocks. Once such a heuristically selected potential selection passes the screening, the computation of the number of cache misses for the further potential selections is omitted. This keeps the required time within practical bounds so that the method can be performed for large programs.

The program will be loaded into main memory according to the optimal selection. This main memory may be for example a conventional DRAM or a ROM or the like. Such a ROM can be used in a machine with a fixed, efficient program. The program can also be stored on a machine readable medium like a magnetic disk, in combination with information about the optimal selection for use in loading the program into the main memory according to the optimal selection. The machine containing the main memory will execute the program by fetching the instructions from main memory.

DESCRIPTION OF THE PREFERRED EMBODIMENTS

The method according to the invention has an embodiment wherein the respective score for each block is a count of executions of that block during the sample of execution, only executions being counted which both cause a cache miss and are separated from a directly preceding execution of that block by execution of other blocks of which an aggregate size is less than a size of the cache memory. Under this condition it is certain that the cache misses that are counted are all conflict misses, i.e. cache misses that can be avoided by assigning different locations to instructions. It is likely that the number of cache misses occurring during the sample of execution can be reduced more by movement of a block for which this count is higher. Therefore use of this count makes the search for an optimal selection efficient.

In another embodiment of the method according to the invention the set of at least one selected block is selected so that the respective scores indicate that each of the at least one selected blocks has at least as high a number of cache misses as any other block, the further blocks comprising all blocks for which the respective scores indicate that they have a lower number of cache misses than the at least one selected block or blocks. Movement of a block which causes the most cache misses is most likely to be a success for reducing the number of cache misses occurring during the sample of execution.

The method according to the invention has an embodiment wherein, for said testing whether any one of the set of potential selection produces a smaller number of cache misses, self-conflicting potential selections, in which any location selected for placement of an instruction of any one of the set of at least one selected block may cause a cache conflict with any location selected for placement of instructions of the same one of the set of at least one selected blocks in the original selection, are excluded from the set of potential selections. Thus, only those potential selections are considered in which the instructions in the selected block are placed at locations the contents of which will be loaded into different cache lines than in the original selection. This ensures that those cache misses will be eliminated that caused the score to indicate the highest number of cache misses. Thus, computation of the number of cache misses for potential selections that do not eliminate all the original cache misses caused by the selected block is avoided and it is avoided that such a potential selection is used to replace the original selection, giving only a small reduction in the number of cache misses.

The invention has another embodiment wherein the locations selected for placement of the instructions of the blocks for each of the original selection and the potential selections are selected logically substantially contiguously, substantially no unused locations occurring between blocks. This is done even if it means that instructions from end and beginning, respectively, of two contiguous blocks will be loaded into the same cache line. Thus the method will find an optimal selection under the constraint that the amount of main memory space used for the program is minimal.

The method according to the invention has a further embodiment wherein the set of at least one selected blocks comprises only one block and wherein the potential selections each have an order of blocks in main memory which differs from an order of blocks in main memory of the original selection in that only the instructions of the one block have been moved relative to the instructions of other blocks. This reduces the number of potential selections that needs to be considered, and thereby the average number of times the total number of cache misses need to be computed.

BRIEF DESCRIPTION OF THE DRAWINGS

The and other advantageous aspects of the invention will be described by way of example using the following figures, of which

FIG. 1 shows a diagram of a machine with a main memory 10, a cache memory 12 and a processor 14. The main memory 10 is for example a DRAM or a ROM. The processor 14 has an address output coupled to the cache memory 12. The cache memory 12 has an instruction output coupled to the processor 14 via a multiplexer 16. The cache memory 12 also has an address output coupled to the main memory 10. The main memory 10 has an instruction output coupled to the processor 14 via the multiplexer 16. The cache memory 12 has a control output coupled to the multiplexer 16 for controlling whether instructions are supplied to the processor 14 from the main memory 10 or the cache memory 12.

Figure 1:
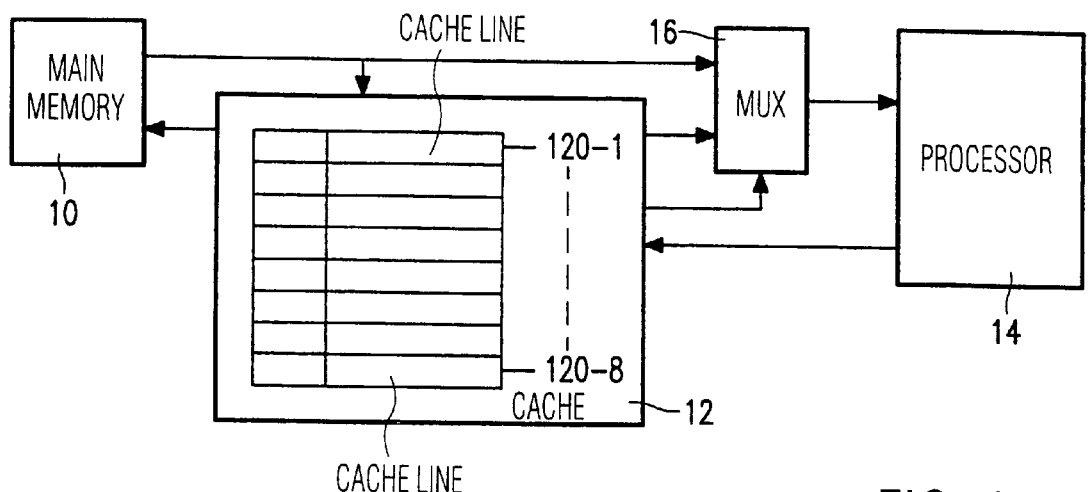
FIG. 1 shows a diagram of a machine with a main memory and a cache memory.

In operation, the processor issues addresses to fetch instructions. The addresses refer to locations in the main memory 10. When an address is issued for the first time, the cache memory 12 passes the address to the main memory 10. In response the main memory 10 supplies the instruction stored in the location referred to by the address to the instruction output of the main memory 10. The cache memory 12 controls the multiplexer 16 so that this instruction is supplied to the processor 14.

When the line of instructions is supplied from the main memory 10 it is also copied into the cache memory 12. When the processor 14 issues the address of an instruction, the cache memory 12 checks the address to see whether a copy of that instruction is available in the cache memory 12 owing to an earlier fetch of that instruction. If a copy is available the cache memory 12 supplies this copy to its instruction output and controls the multiplexer 16 to supply that copy to the processor 14 for execution. In this case the processor 14 does not need to wait for the main memory 10 to supply the instruction and no address needs to be supplied to the main memory 10.

The cache memory 12 contains a number of cache lines 120-1 ... 120-8. Only 8 cache lines are shown, but in practice the number of cache lines will be much larger, for example 512. Each cache line provides memory space, for example 64 byte, for storing a number of copied instructions. The address of the location in main memory 10 in which the instruction is stored determines into which cache line that instruction will be copied. For example an instruction stored at a location with address "A" might be stored in cache line number A mod N (the integer remainder when A is divided by N). Instructions stored at different locations in main memory may be copied to the same cache line: in the example instructions stored at locations whose addresses differ by an integer multiple of N will be copied into the same cache line. These instructions are said to have "conflicting" addresses. Usually instructions from a number of locations with a range of contiguous addresses are stored together in the same cache line. A particular address is said to conflict with another address if the other address differs by a (non-zero) integer multiple of N from any address in the range to which the particular address belongs.

When an instruction from one location is copied into a cache line an "old" instruction with a conflicting address will no longer be available from the cache memory 12. If the processor 14 issues the address of the location in which that old instruction is stored, a "cache-miss" is said to occur. The cache memory 12 will pass that address to the main memory 10 and the processor 14 will have to wait until the main memory 10 returns the instruction stored in the location addressed by that address before the processor 14 can execute the instruction.

The architecture of the cache memory 12 determines which old instructions are no longer available. In a cache memory 12 with a direct mapped architecture none of the instructions with conflicting addresses that have been copied earlier into the cache line will be available any longer. In a cache memory with a set-associative architecture a number (for example 8) of ranges of instructions with mutually conflicting address can be retained together in the cache memory 12. When an instruction is copied into the cache memory 12 only one of that number of ranges will no longer be available. Which one depends on the cache replacement strategy of the architecture. In case of a "Least Recently Used" (LRU) strategy, the range of instructions with conflicting addresses that have been fetched least recently by the processor 14 is no longer available.

Figure 2:
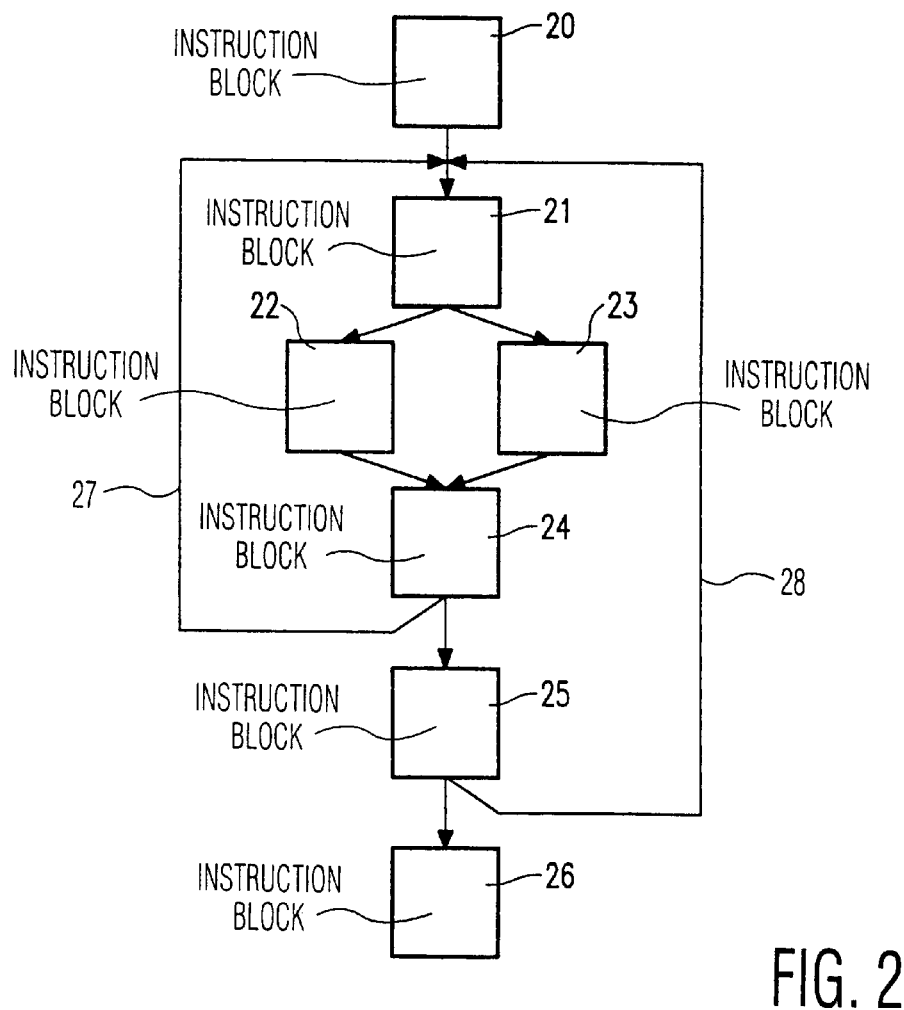
FIG. 2 shows a flow chart of a typical program

FIG. 2 shows a flow chart of a typical program for the machine of FIG. 1. The program contains blocks of instructions 20–26. The instructions from the blocks are stored in the main memory 10 and executed by the processor 14. The program contains loops 27, 28, which cause the instructions of some blocks 21, 22 or 23, 24 to be executed more than once. During execution there may occur a cache miss when a particular instruction is executed more than once and between two executions another instruction is executed which is copied into the same cache line as the particular execution. This type of cache-miss may be avoided by placing the other instruction before execution in a location in the main memory 10 whose address does not conflict with the address of the particular instruction. The invention is concerned with a method of selecting locations for placing instructions in the main memory 10 so that the number of cache-misses is minimized. The invention is concerned with a method of selecting locations for placing instructions in the main memory 10 so that the number of cache-misses is minimized.

Figure 3:
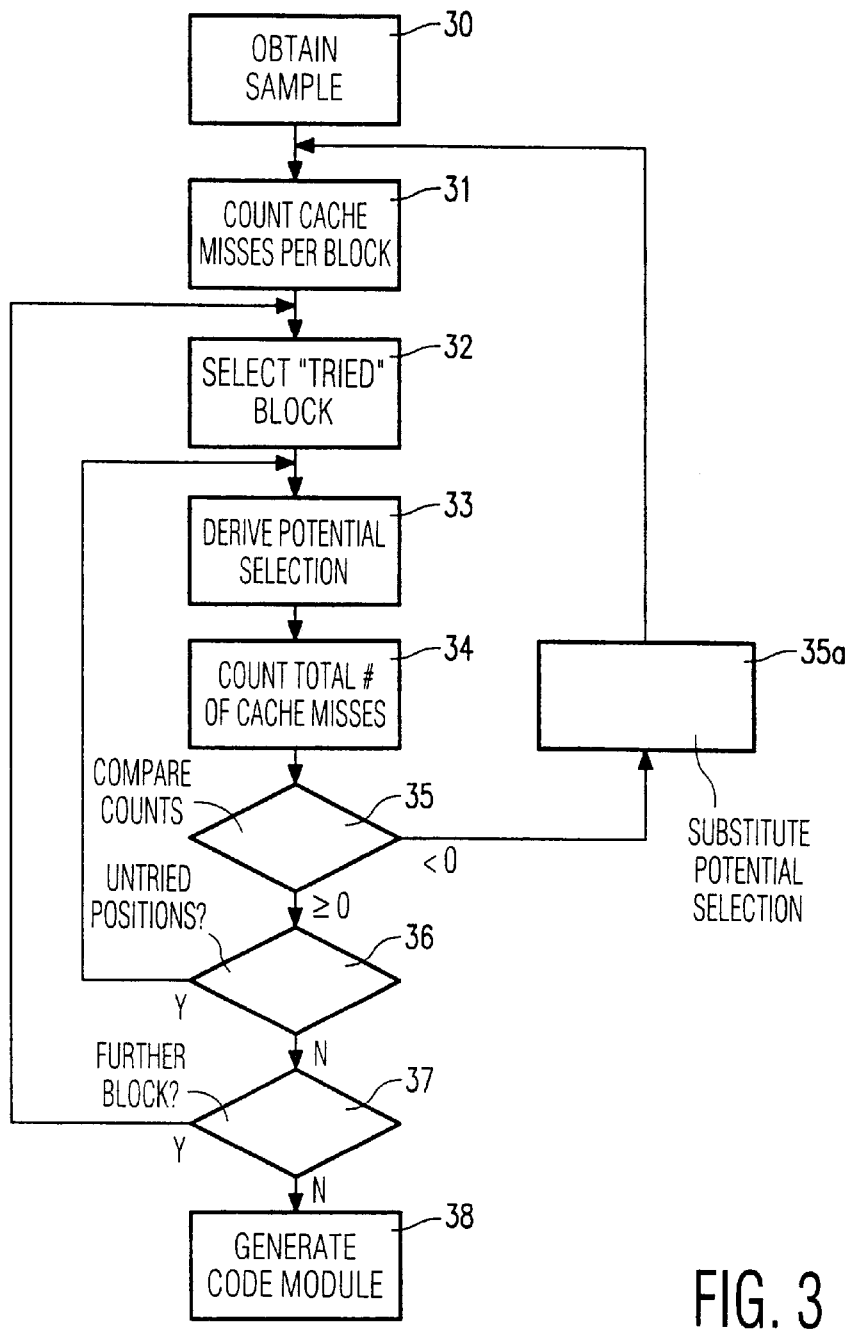
FIG. 3 shows a flow-chart of an embodiment of the method according to the invention

FIG. 3 shows a flow-chart of an embodiment of the method according to the invention. In a first step 30 of the flow-chart a sample of an execution of the program is obtained. Dependent on the data inputted to the program, the blocks 20–26 will be executed in a certain sequence: the loops 27, 28 will be taken a number of times and in the loops 27, 28 either one of two blocks 22, 23 will be executed alternatively. The sample of execution describes the sequence in which the blocks are executed (for example 20, 21, 22, 24, 21, 22, 24, 25, 21, 23, 24, 21, 22, 24 etc.). In the first step it is also determined which cache misses will be considered later as candidates for elimination. For this purpose, the total accumulated number of cache lines "Si" is computed that would be needed for storing the instructions executed up to execution of the ith block in the sequence, i.e. if $B_i$ is the $i^{th}$ block in the sequence (e.g. $B_1$=20, $B_2$=21, $B_3$=22, $B_4$=24, $B_5$=21, etc.) then $S_1$=0 and $S_i+1=S_i+\text{size}(Bi)$. If a block is repeatedly executed then an execution of that block at a position "i" in the sequence is marked as a candidate for elimination of cache misses if there is a next preceding execution of the block at a position "j" in the sequence (j<i) and $S_i-S_j$ <MIN, where MIN is the number of cache lines in the cache memory 12 (plus the number of contents of a cache lines that the cache memory 12 can hold simultaneously in the case of a set associative cache). Herein a next preceding execution of the block is an execution so that there are no intermediate positions "k" (j<k<i) in the sequence where the same block is executed.

Furthermore an original selection of locations for placing the instructions of the program is made in the first step 30 and the number of cache misses is computed that will occur during the sample of execution when the instructions are placed according to the original selection. This computation needs to consider only the execution of blocks 20–26 and not the execution of individual instructions, although the latter is possible in principle. For this computation it is determined for the original selection for each block which cache lines will be involved when the block is copied into the cache memory 12. Then execution according to the sample is simulated at block level, step by step for each block in the sequence of execution, keeping a record for each cache line of which block(s) will be available in the cache line after execution of each block in the sequence, given the architecture of the cache memory 12. Each time when a block occurs in the sequence the number of cache misses is increased by the number of cache lines involved with the block that are not recorded as having that block available.

In the second step 31 of the flow-chart it is counted for each block 20–26 how many cache misses are caused by this block 20–26 during the sample of execution. In the count only those executions in the sequence of executions are counted which have been marked in the first step as a candidate for elimination of cache misses. For these cache misses it is certain that they can be avoided by placing the block at a different location in main memory 10. The count is also performed at a block level as described for determining the total number of cache misses.

In a third step 32 of the flow-chart the block 20–26 is selected that has at least as high count as the count for any other block as determined in the second step 32. This block is marked as "tried".

In the fourth step 33 of the flow-chart a potential selection of location for placing the instructions of the program is derived from the original selection of locations for placing the instructions.

Figure 4:
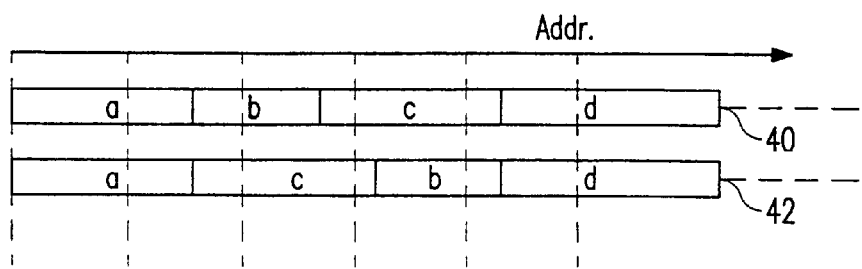
FIG. 4 illustrates two selections of locations for placing instructions in main memory.

FIG. 4 illustrates the original selection 40 and a potential selection 42. The horizontal dimension in FIG. 4 symbolizes the locations in the main memory 10 in order of logically increasing address "Addr". Dashed vertical lines mark the boundaries between ranges of addresses of locations that will be copied into the same cache line. In the original selection 40 four blocks a–d are shown at a position symbolizing the locations of the instructions of those blocks in main memory 10.

FIG. 4 assumes that second block "b" has been selected in the third step 32. In the fourth step 33 of the flow chart a potential selection is derived from the original selection by taking the order in which the blocks appear in the original selection and moving the selected block "b" relative to the other blocks. For this purpose a position is selected to which the selected block is moved. This position must be "untried" as yet for the selected block in combination with the original position. When the position is selected it is marked as "tried", so that it will not be used again for the selected block in combination with the original selection.

By way of example in FIG. 4 the move of the selected block "b" results in the potential selection 42 where the second block "b" has been moved from its position between blocks a and c to a position between blocks c and d. Thus, the order of the blocks in the potential selection is (a c b d) instead of the order (a b c d) in the original selection. In the potential selection 42 the blocks are located substantially contiguously in main memory 10 i.e. substantially without unused locations between the locations used for instructions consecutive blocks (e.g. a–b) in the order. Thus memory space is used very efficiently.

Preferably, positions are tested to determine whether according to the resulting potential selection any instruction of the selected block is stored in a location that corresponds to a cache line that is used for the selected block according to the original selection. If this is the case, such a position is preferably not used for generating the potential selection and another position is selected. Thus only positions will be selected where the cache misses caused by execution of the selected block are eliminated. This saves the time needed for computing the total number of cache misses of potential selections according to the unused position and, more importantly, it avoids that the flow-chart will substitute such a potential selection for the original selection, thereby achieving a smaller reduction in the number of cache misses than would have been possible for other potential selections.

In the fifth step 34 of the flow-chart the total number of cache misses is computed that will occur during the sample of execution when the instructions are placed according to the potential selection 42. This total number of cache-misses will generally differ from the total number of cache misses computed for the original selection 40.

When the instructions are placed in main memory 10 according to the potential selection 42, the instructions of the second block b will be copied into other cache lines in the cache memory than when the instructions are placed according to the original selection 40 (as can be seen from the fact that the second block b appears between different pairs of dashed vertical lines in the two selections). Therefore the cache misses caused by fetching of instructions of block b when the blocks are placed in main memory 10 according to the original selection will not occur when the blocks are placed in main memory according to the potential selection. However the instructions of the block b may give rise to other cache misses, either when they are fetched or because they make other instructions unavailable when they are copied into the cache memory. Other blocks a, c, d may also cause different cache misses because the removal and insertion of the block b causes instructions of other blocks (e.g. block c) to be placed at different locations. All this generally results in different number of cache misses for the potential selection 42 and the original selection 40.

In the sixth step 35 of the flow chart the total number of cache misses computed for the potential selection 42 is compared with the total number of cache misses computed for the original selection 40. If the total number of cache misses computed for the potential selection 42 is less than that computed for the original selection 40, then the original selection 40 is replaced by the potential selection in a substep 35a and the flow-chart resumes from the second step. If the total number of cache misses computed for the potential selection 42 is not less than that computed for the original selection 40 a seventh step 36 is executed to determine whether there are any untried positions left for placing the selected block b. If so, the flow chart returns to the fourth step 33. If no untried positions are left, an eight step 37 determines if there are any further blocks that may serve as selected block. If so, the flow chart returns to the third step 32.

In an alternative embodiment, instead of choosing between executing the substep 35a or the seventh step 36 always when the total number of cache misses computed for the potential selection 42 is not less than that computed for the original selection 40, one uses different criteria for going to the seventh step, for example, one might go to the substep 35a rather than the seventh step at random with certain a probability p (fixed, say p=0.1, or as a function of the change in the number of cache misses, say p=exp(-change*factor) as known from simulated annealing techniques, also when the total number of cache misses computed for the potential selection 42 is not less than that computed for the original selection 40. Similarly, in another alternative embodiment one might decide with a small probability to go to the seventh step 36 even when the total number of cache misses computed for the potential selection 42 is less than that computed for the original selection 40. In this way termination of the search at local optima can be avoided.

If no further blocks are left untried at the eight step 37, the flow-chart concludes that the original selection is an optimal selection, has been found and exits to a ninth step 38 in which a code module is generated, containing the instructions together with information where to place these instructions in main memory 10 according to the optimal selection. The code module is used to load the instructions into the main memory 10 according to the optimal selection, after which the processor 14 may start executing the program. The code module may be stored intermediately on a computer readable medium like a magnetic or optical disk from which it is loaded into the main memory. Instead of exiting to the ninth step 38 only when no further blocks are left untried, in an alternative embodiment one uses a less stringent criterion for exiting, for example that no blocks are left untried that cause more than a certain number of cache misses.

When the method is executed by a computer according to the flowchart of FIG. 3 the greatest amount of computing time will be involved in computing the total number of cache misses for the sample of execution when the instructions are placed according to potential selections. Of course this amount of computing time is minimized already by computing the number of cache misses for blocks and not for individual instructions, and this amount of computing time can be further minimized for example by only counting cache misses involving blocks that are executed more than once in the sample of execution. However, this amount of computing time will still dominate the total execution time.

In the flow-chart of FIG. 3 this amount of computing time is kept in check because the count determined in the second step 31 is used as a heuristic for selecting potential selections from selections that differ from the original selection only by the movement of a single block. This means that the original selection is replaced by a potential selection which reduces the number of cache misses without first computing the total number of cache misses for all possible potential selections. If a potential selection is found in which one selected block has been moved from its position in the original selection and which has a lower total number of cache misses than the original selection, this potential selection replaces the original selection. After that no further blocks are selected that have an equal or lower count as determined in the second step 31. The total number of cache misses does not need to be computed for those blocks and positions.

Of course, this reduction in computation time can be achieved even if deviations from the flow-chart of FIG. 3 are made. For example, instead of replacing the original selection immediately when a potential selection is found with a "better" position for the selected block, one could first compute the total number of cache misses for potential selections for all possible positions of the selected block and replace the original selection with a potential selection that has at most as many cache misses as any other of those potential selections and less than the original selection. Thus the computation of the total number of cache misses for potential selections obtained using other selected blocks is avoided if a "better" potential selection than the original selection is found using the first selected block.

Also one might compute the total number of cache misses for potential selections derived in the fourth step 33, each obtained by moving a respective one of several different selected blocks that have a higher count than further blocks (as determined in the second step 31) before replacing the original selection. The original selection is then replaced with a potential selection that has the least (or at most as low as any) number cache misses of all the potential selections derived by moving respective ones of the several different selected blocks, provided that number cache misses is less than that of the original selection. In this case the computation of the number of cache misses for potential selections obtained by moving the further blocks is avoided if a suitable potential selection is found using the several different selected blocks.

Instead of selecting just one block at a time with a highest count (or at least not-lower count) of cache misses than any other untried block, one may select several blocks at a time with a higher (or at least not-lower) count than any other untried block, and move the instructions all of these selected blocks relative to their positions in the original selection to obtain a potential selection. This may lead to a bigger improvement per iteration.

What is claimed is:

1. A method of selecting memory locations for placing instructions into a main memory, the method comprising obtaining a sample of execution of a program containing the instructions, generating an optimized selection of locations using a local search, the optimized selection producing a minimized number of cache misses when the instructions are placed in the main memory connected to a cache memory according to the optimized selection for the sample of execution, wherein the method comprises:

generating an original selection of locations for placing the instructions;

computing for each respective one of a number of blocks having at least one of the instructions, a respective score indicating a number of cache misses caused by executions of the respective block during the obtaining of the sample of execution when the instructions are placed according to the original selection;

comparing the respective scores for finding at least one selected one of the respective blocks for which the respective scores indicate that the at least one selected one of the respective blocks produces a higher number of cache misses than further ones of the respective blocks;

defining a set of potential selections, wherein in each of the potential selections an order of the blocks in the main memory differs from the order of the blocks in the main memory of the original selection in that the instructions of the at least one selected one of the respective blocks have been moved relative to the instructions of the further ones of the respective blocks;

testing whether for any particular one of the set of the potential selections, the particular potential selection produces fewer cache misses for the sample of execution when the instructions are placed according to the particular potential selection than when the instructions are placed according to the original selection;

either taking a first action: repeating the comparing, the defining and the testing using the further ones of the respective blocks instead of the at least one selected block, or taking a second action: replacing the original selection by the particular potential selection and terminating the comparing, the defining and the testing, the first or second action being taken dependent on whether the potential selection produces fewer cache misses than the original selection; and repeating the computing, the comparing the defining and the testing for the replaced original selection.

2. The method of claim 1, wherein the respective score is a count of executions of the respective block during the sample of execution, the only executions being counted are the executions both causing a cache miss and being separated from a directly preceding execution of the respective block by execution of other ones of the blocks having an aggregate size smaller than a size of the cache memory.

3. The method of claim 1, wherein the set of at least one selected block is selected so that the respective scores indicate that each of the at least one selected blocks has at least as high a number of cache misses as any other block, wherein the further blocks are blocks in which the respective scores indicate that they have a lower number of cache misses than the at least one selected block or blocks.

4. The method of claim 1, wherein, said testing excludes self-conflicting potential selections from the set of potential selections, involving particular ones of the potential selections wherein any location selected for placement of an instruction from any one of the set of at least one selected block causes a cache conflict with a location selected for placing of instructions of the corresponding one of the set of at least one selected block in the original selection.

5. The method of claim 1, wherein the locations selected for placing of the instructions of the blocks for each of the original selection and the potential selections are selected logically substantially contiguously, having substantially no unused locations between blocks.

6. Method according to claim 1, wherein the set of at least one selected blocks comprises only one block and wherein the potential selections each have an order of blocks in main memory which differs from an order of blocks in main memory of the original selection in that only the instructions of the one block have been moved relative to the instructions of other blocks.

7. Method according to claim 1, the method comprising the step of writing the instructions of the program into a computer readable memory according to the optimal selection.

8. Method according to claim 7, wherein said computer readable memory is the main memory of the machine.

9. Method according to claim 7, the method comprising executing the instructions, an instruction being fetched from the cache memory for execution if that instruction is available from the cache memory and from the main memory otherwise, the instruction being copied into the cache memory when the instruction is fetched from the main memory.

10. Compiler for generating instructions for a machine, the compiler being arranged to apply the method according to claim 1 and for writing information specifying the optimal selection into a machine readable medium.

11. Computer program stored on a computer readable medium and arranged for applying the method according to claim 1.

12. Computer programmed with a program for applying the method according to claim 1.

* * * * *